United States Patent [19]
Drown et al.

[11] 3,746,817
[45] July 17, 1973

[54] METAL-ENCLOSED SWITCHGEAR
[75] Inventors: John L. Drown, Monroeville;
 Howard C. Peppel, Murrysville, both of Pa.
[73] Assignee: Westinghouse Electric Corporation, Pittsburgh, Pa.
[22] Filed: May 24, 1972
[21] Appl. No.: 256,319

[52] U.S. Cl. .......................... 200/168 K, 200/166 R
[51] Int. Cl. .............................................. H01h 9/02
[58] Field of Search .................... 250/168 R, 168 K, 250/166 BH, 166 R, 166 B, 168 H; 174/73 R, 126, 59, 60, 65; 317/112; 200/48 R

[56] References Cited
UNITED STATES PATENTS
3,662,137   5/1972   Cleaveland..................... 200/166 K Primary Examiner—Robert K. Schaefer
Assistant Examiner—William J. Smith
Attorney—A. T. Stratton, L. P. Johns et al.

[57] ABSTRACT

Metal-enclosed switchgear unit of standardized dimensions having a front breaker compartment, a rear cable compartment, and an intermediate bus compartment; the front breaker compartment containing a number of stacked subcompartments or chambers in which multipole circuit breakers are disposed; and a partition between the front breaker compartment and the bus compartment which partition includes an insulating supporting structure. At least three main bus bars mounted in the bus compartment and extending horizontally across the switchgear unit and connected respectively to at least three vertical riser conductors for each unit structure in the bus compartment and each riser having a channel-shaped cross section. At least two vertically spaced conductors for each pole of each circuit breaker which conductors extend through and are supported by the insulating supporting structure. Each upper conductor of each pair of vertically spaced conductors for each circuit breaker being connected to a corresponding riser and within the insulating supporting structure. Each lower conductor for each pole of each circuit breaker unit extends through an aperture in the webbed portion of the channel-shaped risers and the insulating supporting structure comprises a sleeve portion extending around each lower conductor and through the aperture in the riser, whereby an insulating barrier is provided between each lower conductor and said riser.

14 Claims, 5 Drawing Figures

United States Patent [19]
Drown et al.
[11] 3,746,817
[45] July 17, 1973
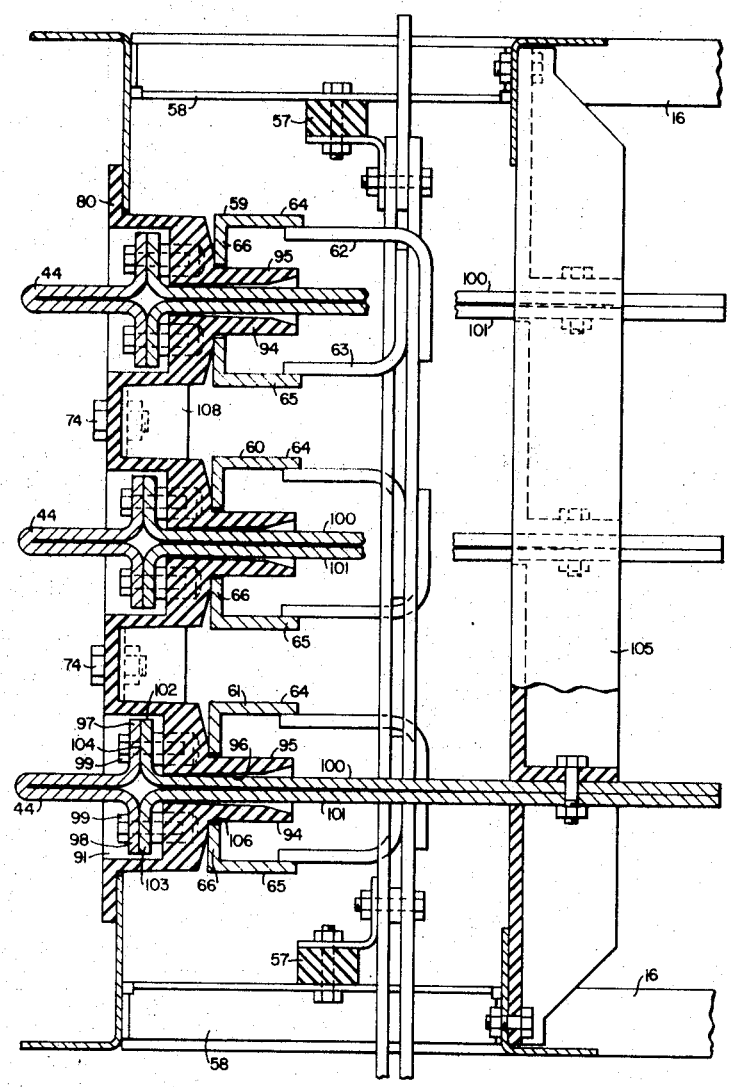

Patented July 17, 1973

3,746,817

5 Sheets-Sheet 1

METAL-ENCLOSED SWITCHGEAR

BACKGROUND OF THE INVENTION

1. Field of the Invention

This invention relates to metal-enclosed switchgear and more particularly to a combination of channel-shaped risers and insulating supporting structure for connecting the risers to current conductors extending from circuit breakers contained in the metal enclosed switchgear.

2. Description of the Prior Art

A metal-enclosed switchgear installation usually includes a plurality of upright units assembled side-by-side to provide an assembly capable of housing a desired number of circuit breakers of other circuit controlling devices. The number of units assembled is normally dependent upon the handling and shipping facilities available. The switchgear installation also includes bus bars and riser conductors which are interconnected in a suitable manner.

Each unit comprises a framework, such as of formed sheet metal construction, and is usually divided into three vertical compartments includng a breaker compartment at the front, a cable compartment at the rear, and a bus or conductor compartment therebetween. The breaker compartment in turn is divided into a plurality of vertically stacked subcompartments for housing individual circuit breakers or other apparatus. The bus compartment contains main phase bus bars and riser conductors for connecting the bus bars to the circuit breakers. Feeder conductors that extend from the circuit breakers through the bus compartment terminate in the cable compartment at the rear of the unit. The cables which supply the various load or feeder circuits with electric power are connected to the feeder conductors when the switchgear is installed in service.

Heretofore, the phase bus bars and riser conductors have usually been composed of copper with bolted joints between the bus bars and the conductors. For economic reasons it is desirable to utilize aluminum in place of copper with welded joints between the aluminum bus bars and conductors.

However, for metal-enclosed switchgear units of the type herein involved such as low voltage switchgear having a rating up to 600 volts when an abnormal electrical condition occurred, short circuit stresses may create high current surges through the closely spaced parallel riser conductors, thereby causing the conductors to bend away from or towards each other. Accordingly, it is one object of this invention to provide riser conductors which are channeled members having a U-shaped cross section, whereby the conductors have sufficient rigidity to withstand the stresses resulting from abnormally high surges of current such as caused by short circuits.

Associated with the foregoing has been a problem of assembly and periodic maintenance of the switchgear units. For example, heretofore, stationary contact stabs were necessarily replaced from the rear of the unit and required access to the bus compartment for maintenance which always involved a possibility of maintenance personnel inadvertently contacting an energized conductor. Moreover, the switchgear units of prior construction usually required at least two trained personnel for dismantling and replacing the stationary contacts. Accordingly, it is another object of this invention to provide stationary contact stabs or conductors which are easily replaced from the front of the unit, thereby eliminating the need for access to the rear bus compartment for maintenance.

SUMMARY OF THE INVENTION

In accordance with this invention it has been found that the foregoing problems may be overcome by providing a low voltage metal-enclosed switchgear unit in which stab conductors are attached directly to vertical bus conductors, all of which conductors are partially or wholly supported by an insulating conductor-supporting structure which is mounted in a partition disposed between the circuit breaker compartment and the bus compartment of the switchgear unit, the vertical conductors being channel members having a U-shaped cross section including a webbed portion which is attached to the stab conductors through apertures in the insulating conductor-supporting structure and which webbed portions are apertured to enable the feeder conductors to extend through vertically spaced openings below the positions of the stab conductors and between the circuit breaker compartment and the bus compartment, and the insulating conductor-supporting structure including a sleeve portion for each feeder conductor which sleeve portion extends through the corresponding aperture in the vertical conductor and is disposed between the feeder conductor and the bus conductor, whereby arcing between the bus conductor and feed conductor is avoided.

DESCRIPTION OF THE PREFERRED EMBODIMENT

Figure 1:
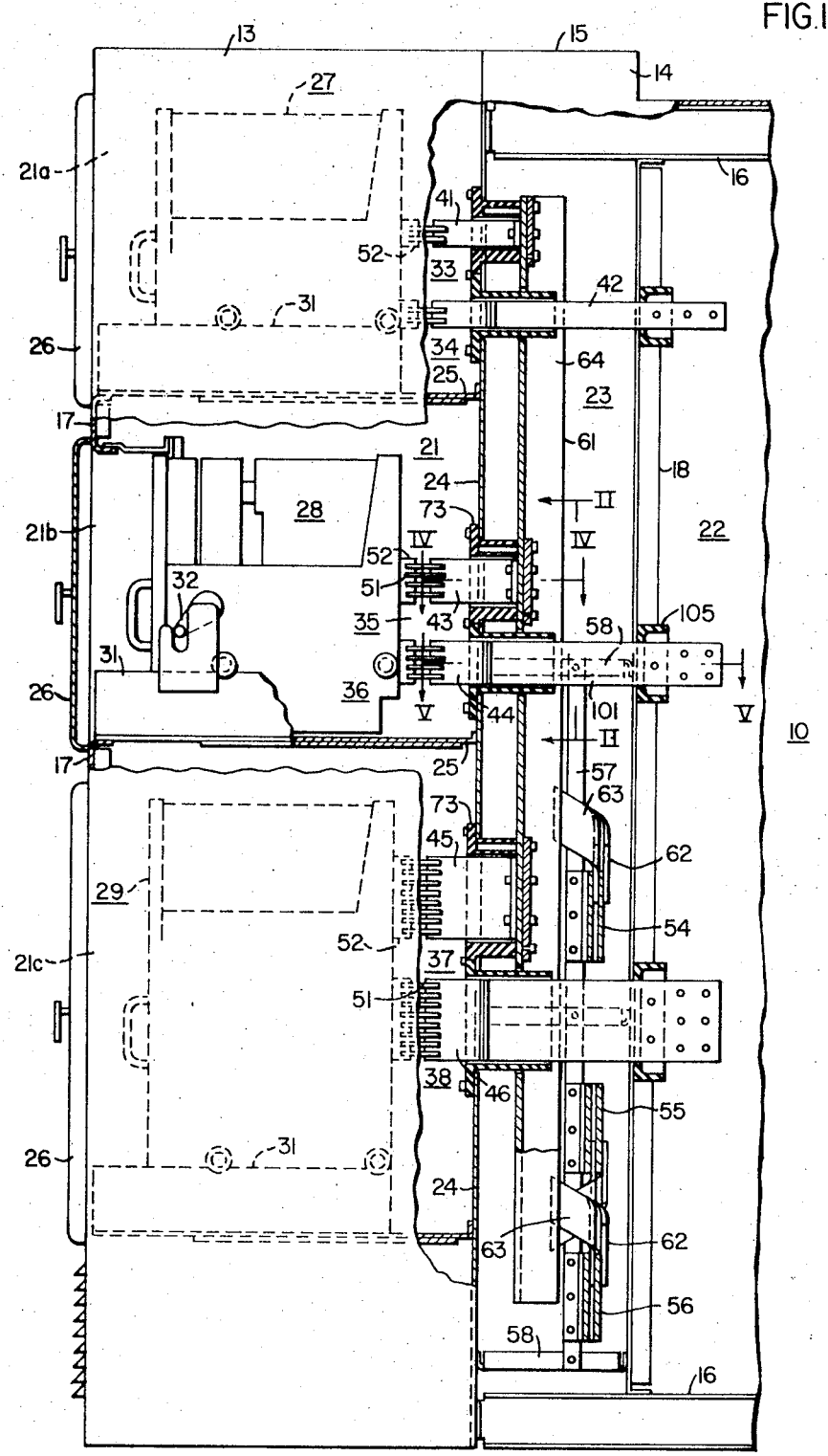
FIG. 1 is a view, partly in side elevation and partly in section, of a metal-enclosed switchgear unit employing the principal features of the invention.

In FIG. 1, a switchgear unit is generally indicated at 10 and is a generally rectangular upstanding structure which is usually disposed in side-by-side relation with additional units as may be desired. The units are generally described in U.S. Pat. No. 3,562,593 issued Feb. 1, 1971, and assigned to the Westinghouse Electric Corporation. Though the structure of the unit is not described in detail herein, each unit comprises side sheets 13 and 14, a top side cover sheet 15, horizintal channel members 16 and 17, and vertical angle members 18 extending between and attached to the horizontal channel members 16. The channel members 17 extend between the side sheets 13. Additional channel members not shown in the present drawing may be included in the structure.

Each unit includes a breaker compartment 21 at the front, a cable compartment 22 at the rear, and a bus compartment 23 between the breaker and cable compartments. The breaker compartment 21 is separated from the bus compartment 23 by a vertical sheet metal barrier 24. The breaker compartment 21 is subdivided into a plurality of vertically stacked subcompartments by horizontal barriers 25. Each subcompartment has a hinged door 26 at the front thereof.

Circuit breaker units 27, 28, and 29 are mounted in vertically disposed subcompartments 21a, 21b, and 21c respectively. The breaker units are of any suitable type, such as for example, the type disclosed in U.S. Pat. No. 3,562,459, issued Feb. 9, 1971 to Fred Bould and Richard Hauser and assigned to the Westinghouse Electric Corporation. Briefly, each breaker unit is mounted on a track 31 in a subcompartment and is removable horizontally therefrom. A suitable levering device 32 is provided for actuating the breaker unit to predetermined positions in the subcompartment.

The breaker unit 27 may have a relatively low current-carrying capacity, the breaker unit 28 may have a higher current-carrying capacity, and the breaker unit 29 may have a still higher current-carrying capacity. Or, the breaker units 27, 28, and 29 may all have the same capacity. As shown the breaker units are the same width and depth, but the unit 29 has a greater height than the units 27 and 28.

As shown in FIG. 1 the breaker unit 27 has an incoming primary disconnect member 33 and an outgoing primary disconnect member 34 for each pole of each breaker unit. The disconnect members 33 and 34 are spaced vertically. Likewise, each pole of the breaker unit 28 has an incoming primary disconnect member 35 and an outgoing disconnect member 36 which are vertically spaced. The breaker unit 29 has an incoming primary disconnect member 37 and an outgoing primary disconnect member 38 for each pole of each unit. The members 37 and 38 are vertically spaced.

The primary disconnect members 33 engage vertical sides of horizotnally extending stab conductors 41 and the primary disconnect members 34 engage vertical sides of horizontally extending feeder conductors 42. Likewise, the primary disconnect members 35 engage stab conductors 43 and the primary disconnect members 36 engage feeder conductors 44. The primary disconnect members 37 engage stab conductors 45 and the primary disconnect members 38 engage feeder conductors 46.

The primary disconnect members of the breaker units may be of any suitable type, such as, for example, the one described in U.S. Pat. No. 3,427,419, issued Feb. 11, 1969 to Joseph D. Findley, Jr., and assigned to the Westinghouse Electric Corporation. As shown in FIG. 1, each primary disconnect member comprises a plurality of pairs of vertically spaced contact fingers 51 removably mounted on a generally rectangular conducting member 52 in the breaker unit. The contact fingers 51 of each pair of fingers are horizontally spaced to engage vertical sides of either a stab conductor or a feeder conductor as the case may be. As described in the U.S. Pat. No. 3,427,419 the contact fingers are spring-biased towards each other. The primary disconnect members of other types, such for example, as the one described in U.S. Pat. No. 2,254,914, issued Sept. 2, 1941 to H. H. Rugg, may be utilized. Therefore, further details of the primary disconnect members are not described herein.

Figure 4:
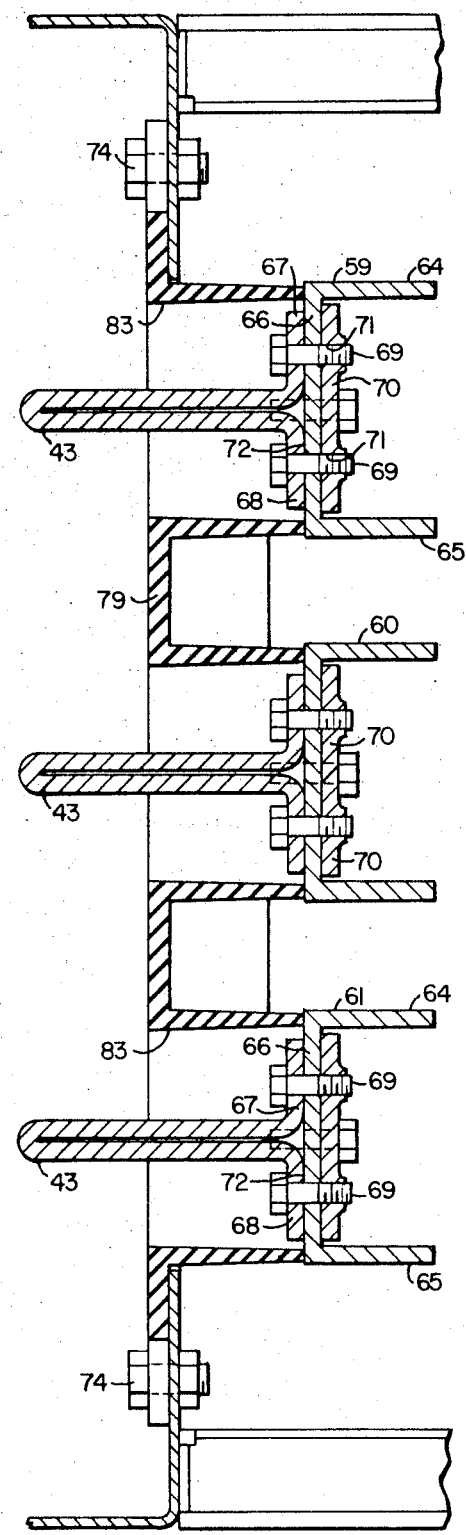
FIG. 4 is a horizontal sectional view taken on the line IV—IV of FIG. 1.
Figure 5:
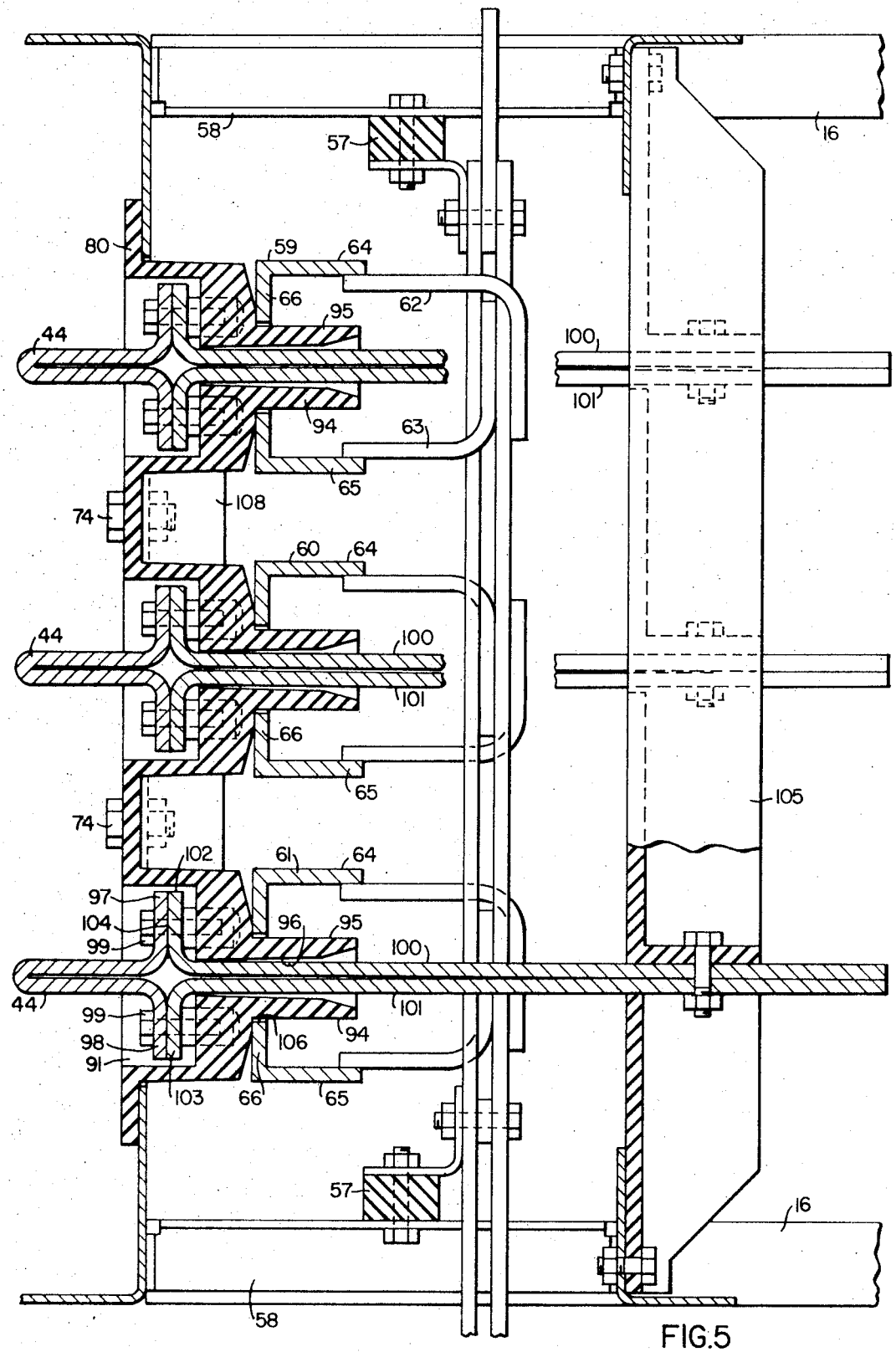
FIG. 5 is a horizontal sectional view taken on the line V—V of FIG. 1.

As shown in FIGS. 4 and 5, the stab conductors 41 and 43 may be of a U-shaped configuration with generally rectangular legs having vertical sides engaged by the contact fingers 51.

As shown in FIG. 1, three horizontally extending main bus bars 54, 55, and 56 extend across the lower portion of the bus compartment 23 and are mounted on a pair of spaced vertical support bars 57, only one of which is shown in FIG. 1. The support bars 57 are attached to vertically spaced mounting members 58 which extend between the angle member 18 and the sheet metal barrier 24. The bus bars 54, 55, and 56 are electrically connected to corresponding vertical risers 59, 60, and 61 as shown in FIG. 4a, respectively, by suitable means such as bus connectors 62 and 63. The vertical risers 59, 60, and 61 are composed of a metallic material having a high coefficient of electrical conduction, such as copper or aluminum. As shown more particularly in FIG. 4, the vertical risers 59, 60, and 61 are preferably U-shaped in cross-section or channel members by which power from the bus bars is carried to the several stab conductors 41, 43, and 45.

During operation of the switchgear unit 10 any abnormality, such as a short circuit, may occur which may momentarily cause an excessive current load to be carried by the vertical risers. As a result, the risers 59, 60, and 61 are subjected to high magnetic forces or stresses. It is one feature of this invention to provide the vertical risers with a channel or U-shaped cross section in order to not only increase the cross sectional area for increased current carrying capacitor, but also to increase the structural strength of the risers to withstand such abnormally large magnetic forces, and thereby prevent their distortion.

Each of the risers 59, 60, and 61 therefore includes a pair of spaced flanges 64 and 65 as well as a web or intermediate portion 66 therebetween. As shown in FIG. 4a, the rear edges of the flanges 64 and 65 are attached to corresponding bus connectors 62 and 63, respectively. The other end of each connector 62 and 63 is attached to a corresponding bus bar 54, 55, or 56. The end portion of the bus connectors 62 and 63 are suitably attached to the flanges 64 and 65 of the vertical risers, as well as to the main bus bars 54, 55, and 56, in a suitable manner such as metallurgical bonding or welding.

Figure 3:
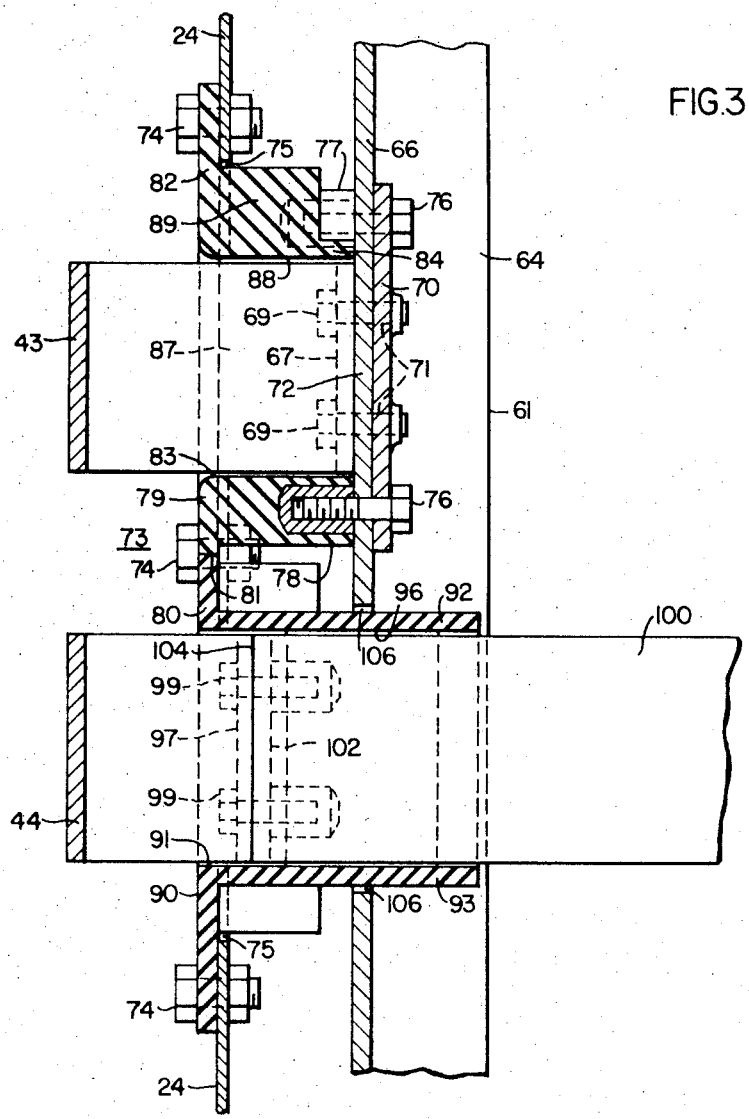
FIG. 3 is a vertical sectional view taken on the line III—III of FIG. 2.

As shown in FIGS. 1, 3, and 4, each stab conductor 41, includes a pair of oppositely disposed flanges 67 and 68 by which the conductor 41 is connected directly to the web or intermediate portion 66 of the vertical riser 61 by pairs of spaced similar bolts 69. A backup plate 70 is mounted on the side of the web 66 opposite that of the stab conductor 41 between the flanges 67 and 68, said plate being provided with tapped holes 71 to receive the bolts 69. Thus, the stab conductors 41 are in direct surface-to-surface contact 72 with the web or intermediate portion 66 of the vertical riser 61.

The vertical risers 59, 60, and 61 are supported by electrically insulating members generally indicated at 73 (FIG. 3), which are mounted on the sheet metal barrier 24 by bolts 74 and extend through an aperture 75 in the barrier. Spaced bolts 76 extend through the backup plate 70 and the web 66 and threadably engage thickened portions 77 and 78 of the member 73. Although the insulating member 73 may be composed of one integral unit, it is preferably composed of two separable units including an upper portion 79 and a lower portion 80 having surface-to-surface edges forming an interface 81. The upper and lower portions 79 and 80 are insulating members composed of an electrically insulatng or dielectric material such as glass reinforced polyester resin.

As shown more particularly in FIG. 3 the upper portion 79 comprises a vertical planar member 82 having a plurality of horizontally spaced rectangular openings 83 and outturned box-like or sleeve portions including (FIG. 2) upper and lower horizontal members 84 and 85 and spaced vertical members 86 and 87. The members 84–87 define a channel 88 which extends from each opening 83. As viewed in FIG. 3, the right edges of the several members 84–87 terminate in a plane of abutment with the left surface of the web 66 or the riser 61, whereby the stab conductors 41 extend through the channel to a location to the right of the planar member 82. The upper portion 79 is also provided with a flange 89 for the purpose of reinforcing said portion as well as to provide additional electrically insulating surface to prevent electrical creep or flashovers between adjacent metallic parts, such as the riser 61 and the barrier 24.

The lower portion 80 comprises a planar portion 90 in which a pluarlity of horizontally spaced openings 91 are provided in vertical alignment with corresponding openings 83 in the upper portion 79. In addition, the lower portion 80 includes a box-like or sleeve portion extending outwardly through the opening 75 in the sheet metal barrier 24, which portion includes vertically spaced horizontal members 92 and 93 (FIG. 2), as well as horizontally spaced vertical members 94 and 95 which members 92–95 define a channel 96 corresponding to each opening 91.

In FIGS. 3 and 5, the feeder conductors 44 are mounted within the openings 91 of the lower portion 80. For that purpose, each conductor 44 includes oppositely disposed flanges 97 and 98 which flanges are attached by bolts 99 to a pair of horizontally disposed conductors 100 and 101. The conductor 100 includes an outturned flange 102 and the conductor 101 includes a flange 103. The bolts 99 hold the flanges 97 and 102 as well as the flanges 98 and 103 together in direct surface-to-surface contact at interface 104. The bolts 99 likewise extend into the body of the lower portion where they are seated in threaded engagement therewith.

As shown in FIG. 5 the conductors 100 and 101 extend horizontally through the channel 96 and cross the bus compartment 23 and into the cable compartment 22. Additional support for the conductors 100 and 101 is provided by electrically insulating members 105 which are horizontally disposed between spaced angle members 18.

As shown more particularly in FIGS. 3 and 5, the sleeve portion extends through an opening 106 in the web 66 of the corresponding vertical riser 61 and into the zone or region between the spaced flanges 64 and 65, whereby the sleeve portion serves as an electrical insulator between the pair of conductors 100 and 101 and the channel shaped vertical riser 61.

Accordingly, electric power enters the switchgear unit 10 through the horizontal bus bars 54, 55, and 56, through the bus connectors 62 and 63 to the vertical risers 59–61, then to the stab conductors 41 and into the circuit breaker 27 when the separable contacts of the circuit breaker are closed. From the circuit breaker, the power flows through the feeder conductors 42 to the conductors 100 and 101 which are in turn connected to cables leading to the load.

Figure 2:
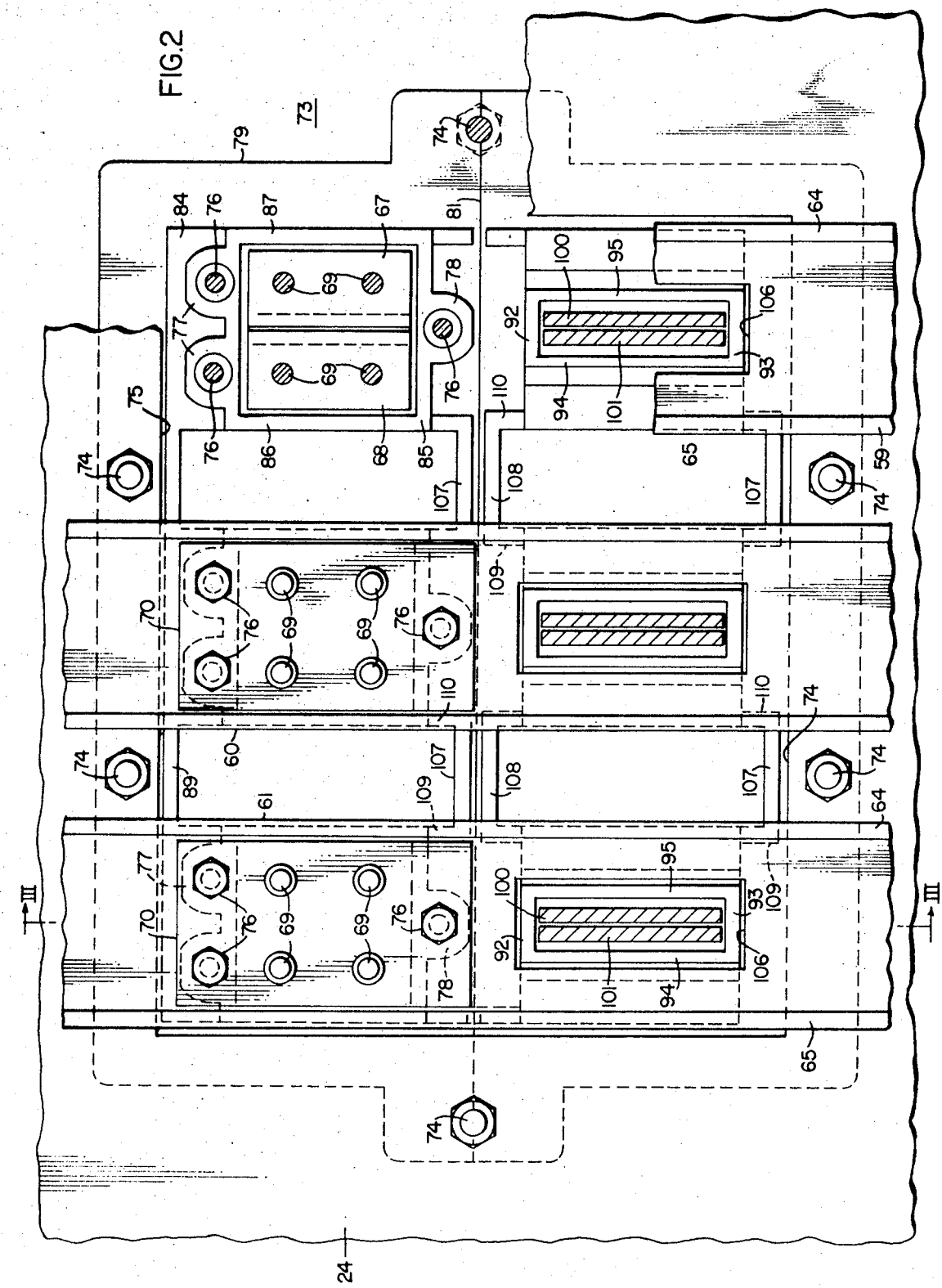
FIG. 2 is an enlarged vertical sectional view taken on the line II—II of FIG. 1.

Finally, as shown in FIG. 2, the upper portion 79 and the lower portion 80 of the insulating member 73 are provided with integrally molded flange means for increasing resistance to electrical creep or flashovers between the several conductors and risers. For that purpose, the means include horizontal flanges 107 and 108 as well as vertical flanges 109 and 110.

Accordingly, the switchgear unit of the preent invention satisfies several problems that existed in the prior existing units. The channel-shaped vertical risers not only provide additional cross-sectional areas for proper conduction of high currents in a minimum space but also provides structural strength for overcoming or resisting extraordinary magnetic forces incurred by abnormal currents, such as short circuit stresses. Moreover, a more simplified means for connecting the risers to the stab conductors as well as means for connecting feeder conductors to load conductors are provided, whereby insulation and maintenance is facilitated by requiring the services of only one person.

It is understood that the upper and lower insulating members may be interchanged or for certain types of connections two of one kind of insulator may be used.

What is claimed is:

1. Metal-enclosed switchgear comprising a generally rectangular upstanding cell structure having a breaker compartment at the front and a bus compartment at the rear of the breaker compartment, said breaker compartment being divided into a plurality of vertically stacked subcompartments, a vertical barrier wall between the breaker compartment and the bus compartment, multipole circuit breaker units removably mounted in the subcompartments at different elevations, each pole for each breaker unit having at least two vertically spaced incoming and outgoing primary disconnect members, at least three main phase bus bars mounted in the bus compartment and extending horizontally across the switchgear unit, at least three vertical risers for each cell structure, said risers being mounted in the bus compartment, at least a pair of vertically spaced conductors for each pole of each circuit breaker unit for detachable engagement with corresponding primary disconnect members, an electrically insulating conductor supporting structure in the vertical barrier for each subcompartment, at least one of each of the pairs of the vertically spaced conductors 42 associated with one of the pair of disconnect members extending between each subcompartment and the bus compartment, the other of each of the pairs of the vertically spaced conductors associated with the other of the pair of disconnect members extending through the vertical barrier and being electrically connected to a corresponding riser for each cell structure, the electrically insulating conductor supporting structure comprising a sleeve portion extending into the bus compartment and around said at least one of each of the pairs of vertically spaced conductors, and the sleeve portion also being disposed between the associated conductor and the riser for the corresponding vertically spaced conductor.

2. The metal-enclosed switchgear of claim 1 in which the risers are channel in cross section.

3. The metal-enclosed switchgear of claim 1 in which the insulating conductor supporting structure includes at least a pair of vertically spaced apertures for each pole of the circuit breaker unit in the associated compartment through which said pair of vertically spaced conductors associated with each pole of the circuit breaker unit extend, each riser being mounted on the side of the insulator supporting structure facing the bus compartment and extending around one of the apertures for one of said pair of vertically spaced conductors, and the other of said pair of vertically spaced conductors being connected to a riser through the other of said pair of apertures.

4. The metal-enclosed switchgear of claim 3 in which the risers have apertures coinciding with the positions of the sleeve portions of said insulating support structures, and the sleeve portions extending through the latter apertures.

5. The metal-enclosed switchgear of claim 4 in which the risers are channel members having spaced flange portions and an interconnecting portion therebetween, the apertures in the risers being in the interconnecting portions.

6. The metal-enclosed switchgear of claim 5 in which the conductors for corresponding disconnect members is for the lower of said pairs of disconnect members.

7. The metal-enclosed switchgear of claim 1 in which the cell structure comprises a cable compartment on the side of the bus compartment opposite the breaker compartment, and one of the vertically spaced conductors for each pole of each circuit extends through the bus compartment to the cable compartment.

8. The metal-enclosed switchgear of claim 7 in which a second vertical barrier wall is disposed between the bus compartment and the cable compartment.

9. Metal-enclosed switchgear comprising a generally rectangular upstanding cell structure having a breaker compartment at the front and a bus compartment at the rear of the breaker compartment, said breaker compartment being divided into a plurality of vertically stacked subcompartments, a vertical barrier wall between the breaker compartment and the bus compartment, multi-pole circuit breaker units removably mounted in the subcompartments at different elevations, each pole for each breaker unit having at least two vertically spaced incoming and outgoing primary disconnect members, at least three main phase bus bars mounted in the bus compartment and extending horizontally across the switchgear unit, at least three vertical risers for each cell structure, said risers being mounted in the bus compartment, at least two vertically spaced conductors for each pole of each circuit breaker unit for detachable engagement with corresponding primary disconnect members, an insulating conductor supporting structure in the vertical barrier for each subcompartment, the vertically spaced conductor for one of the disconnect members extnding between the subcompartment and the bus compartment, the other of the vertically spaced conductors for the other of the disconnect members associated with each pole of each circuit breaker unit extending through the vertical barrier and being electrically connected to a corresponding riser for each cell structure, and each of said risers having a U-shaped cross section including spaced flanges and an intermediate web portion.

10. The metal-enclosed switchgear of claim 9 in which the web portion of each riser is electrically connected to said other of the vertically spaced conductors.

11. The metal-enclosed switchgear of claim 10 in which each riser has an aperture corresponding to the position of each of the vertically spaced conductors for said one of the disconnect members associated with each pole of each circuit breaker unit, and the insulating conductor supporting structure comprising a sleeve portion around each last mentioned conductor and through the aperture in the riser.

12. The metal-enclosed switchgear of claim 11 in which the upper conductor of the vertically spaced conductors of each circuit breaker unit are connected to corresponding risers and the lower conductors extend through the apertures of the risers.

13. The metal-enclosed switchgear of claim 10 in which the cell structure comprises a cable compartment on the side of the bus compartment opposite the breaker compartment, and one of the vertically spaced conductors for each pole of each circuit breaker unit extends through the bus compartment to the cable compartment.

14. The metal-enclosed switchgear of claim 10 in which the second vertical barrier wall is disposed between the bus compartment and the cable compartment.

* * * * *